US008442760B2

(12) United States Patent
Watanabe (10) Patent No.: US 8,442,760 B2
(45) Date of Patent: May 14, 2013

(54) MOBILE OBJECT POSITIONING DEVICE AND NAVIGATION APPARATUS

(75) Inventor: Yuusuke Watanabe, Anjo (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 13/276,459

(22) Filed: Oct. 19, 2011

(65) Prior Publication Data

US 2012/0109517 A1   May 3, 2012

(30) Foreign Application Priority Data

Oct. 27, 2010   (JP) ................................. 2010-240997

(51) Int. Cl.
*G01C 21/34*   (2006.01)
*G01S 19/40*   (2010.01)

(52) U.S. Cl.
USPC .......................................................... 701/431

(58) Field of Classification Search .................. 701/431, 701/300, 301, 302; 342/357.23
See application file for complete search history.

(56) References Cited

U.S. PATENT DOCUMENTS

| | | | |
|---|---|---|---|
| 5,491,486 A | 2/1996 | Welles, II et al. | |
| 2004/0225439 A1 | 11/2004 | Gronemeyer | |
| 2004/0252052 A1 | 12/2004 | Kitatani | |
| 2006/0265127 A1 * | 11/2006 | Qu | 701/213 |
| 2009/0207170 A1 * | 8/2009 | Matsunaga | 345/427 |
| 2009/0306890 A1 | 12/2009 | Yoshida | |

FOREIGN PATENT DOCUMENTS

| | | |
|---|---|---|
| JP | B2-3103247 | 8/2000 |
| JP | A-2003-207351 | 7/2003 |
| JP | A-2006-189320 | 7/2006 |
| JP | A-2006-242578 | 9/2006 |
| JP | A-2007-108030 | 4/2007 |
| JP | A-2008-32604 | 2/2008 |
| WO | WO 2011/109860 | * 9/2011 |

OTHER PUBLICATIONS

Office Action Dated Nov. 5, 2012, and mailed on Nov. 13, 2012 in corresponding JP Application No. 2010-240997 (and English translation).

* cited by examiner

*Primary Examiner* — Mary Cheung
*Assistant Examiner* — Brian P Sweeney
(74) *Attorney, Agent, or Firm* — Posz Law Group, PLC (57) ABSTRACT

A GPS receiver is used to receive a signal from GPS satellites, and a current vehicle position is detected based on the received signal. A control unit estimates the current vehicle position based on a travel speed of a vehicle from a vehicle speed sensor and a travel direction of the vehicle from a direction sensor. After correcting the estimated current vehicle position based on the current vehicle position from the GPS receiver, a power supply to the GPS receiver is turned off, and thereafter an error of the estimated current vehicle position is calculated based on an error accumulated for a certain time period regarding the speed and the direction. When the error of the estimated current vehicle position exceeds an error tolerance, the power supply for the GPS receiver is restarted to correct the estimated current vehicle position.

3 Claims, 6 Drawing Sheets

MOBILE OBJECT POSITIONING DEVICE AND NAVIGATION APPARATUS

CROSS REFERENCE TO RELATED APPLICATION

The present application is based on and claims the benefit of priority of Japanese Patent Application No. 2010-240997, filed on Oct. 27, 2010, the disclosure of which is incorporated herein by reference.

TECHNICAL FIELD

The present disclosure generally relates to a mobile object positioning device for determining a position of a mobile object and a navigation apparatus using such positioning device for use in a vehicle.

BACKGROUND

In recent years, positioning devices used in a vehicle navigation apparatus generally determine a position of a vehicle in an estimating manner by a dead-reckoning method. The dead-reckoning method calculates the position of the vehicle, as the vehicle is driving, by using the current position of the vehicle provided by a GPS, and corrects the detected position using the speed and direction of the vehicle, which can be detected by a speed sensor and a gyro sensor, respectively.

Due to the detection errors of the speed and gyro sensors, the error of the positioning accumulates as time lapses, and accuracy of the vehicle's position deteriorates. Therefore, absolute positioning coordinates derived from the GPS receiver, which are free from accumulated positioning error, is ideal for the improvement of accuracy and correction of the current position of the vehicle.

In addition, in terms of its positioning accuracy, the GPS receiver is susceptible to the influence of multi-path reception of GPS signals, such as, when the vehicle is traveling in a valley of high-rise buildings. Therefore, a conventional method of tracing a vehicle based on the dead-reckoning method and correcting the trace of the vehicle by the GPS is considered as practical and is widely used.

In addition, along with other electrical devices in a vehicle, navigation apparatuses must also be energy efficient without sacrificing performance, such as position accuracy. One method of providing an energy efficient device with position accuracy is disclosed in Japanese Patent JP-A-8-512163 (JP '163). In JP '163 the power supply for the GPS receiver is turned off when the vehicle is stopping, which may be determined by the speed and gyro sensor (i.e. sensors other than the GPS receiver).

However, such operation of the navigation apparatus may cause a problem when the vehicle is stopping for a long time or when the vehicle frequently stops, both of which may lead to a continuation of power loss for the GPS receiver, thereby disabling the acquisition of the vehicle position from the GPS receiver. Such operation scheme is also problematic when the vehicle continues to travel for a long time, because the power supply for the GPS receiver may seldom be turned off, thereby disabling power saving of the navigation apparatus during such travel.

SUMMARY

In an aspect of the present disclosure, the mobile object positioning device includes: a GNSS receiver, a speed detector, a direction detector, a position estimation unit, an error calculation unit, and a control unit.

The GNSS receiver receives a signal transmitted by a GNSS satellite, and a position of the mobile object is detected based on the received signal. The speed detector detects the travel speed of the mobile object. The direction detector detects the travel direction of the mobile object.

The position estimation unit estimates a current position of the mobile object based on the travel speed and the travel direction of the mobile object detected by the speed detector and the direction detector. The error calculation unit calculates, based on a time-wise accumulation of at least one of a speed detection error of the vehicle speed detector or a direction detection error of the direction detector, the error included in the current position of the mobile object from the position estimation unit.

The control unit corrects the current position of the mobile object which is detected by the position estimation unit based on the current position of the mobile object detected by the GNSS receiver, and then turns off the power supply for the GNSS receiver. The control unit determines whether the error of the estimated current position of the mobile object estimated by the position estimation unit is within a predetermined error tolerance.

When the error is within the error tolerance, the control unit keeps the turning off of the power supply for the GNSS receiver. When the error is not within the error tolerance, the control unit turns on the power supply for the GNSS receiver for correcting the estimated current position of the mobile object estimated by the position estimation unit based on the current position of the mobile object detected by the GNSS receiver. Such operation of turning off and on of the GNSS receiver and correction of the estimated current position is repeatedly performed.

Further, in addition to the basic configuration described above, a vehicle navigation apparatus includes: the mobile object positioning device disposed in the vehicle (i.e., the mobile object), a display unit for displaying an image; a destination setting unit for setting a destination of a travel of the vehicle according to a user operation; a map data storage for storing map data of a map that is used for a route guidance of the vehicle; a route guidance unit for performing the route guidance toward the destination set by the destination setting unit based on the current vehicle position from the mobile object positioning device and the map data; a display control unit for displaying the current vehicle position during the route guidance toward the destination performed by the route guidance unit, as an image of the map data on the display unit after reading the data from the map data storage, in a manner that superposes the current vehicle position on the map.

BRIEF DESCRIPTION OF THE DRAWINGS

Objects, features, and advantages of the present disclosure will become more apparent from the following detailed description made with reference to the accompanying drawings, in which.

DETAILED DESCRIPTION

An embodiment of the present disclosure is explained in the following. The embodiment is not necessarily limited to the following, and may be modified and/or changed as long as it pertains to the spirit of the advantageous idea of the present disclosure.

Figure 1:
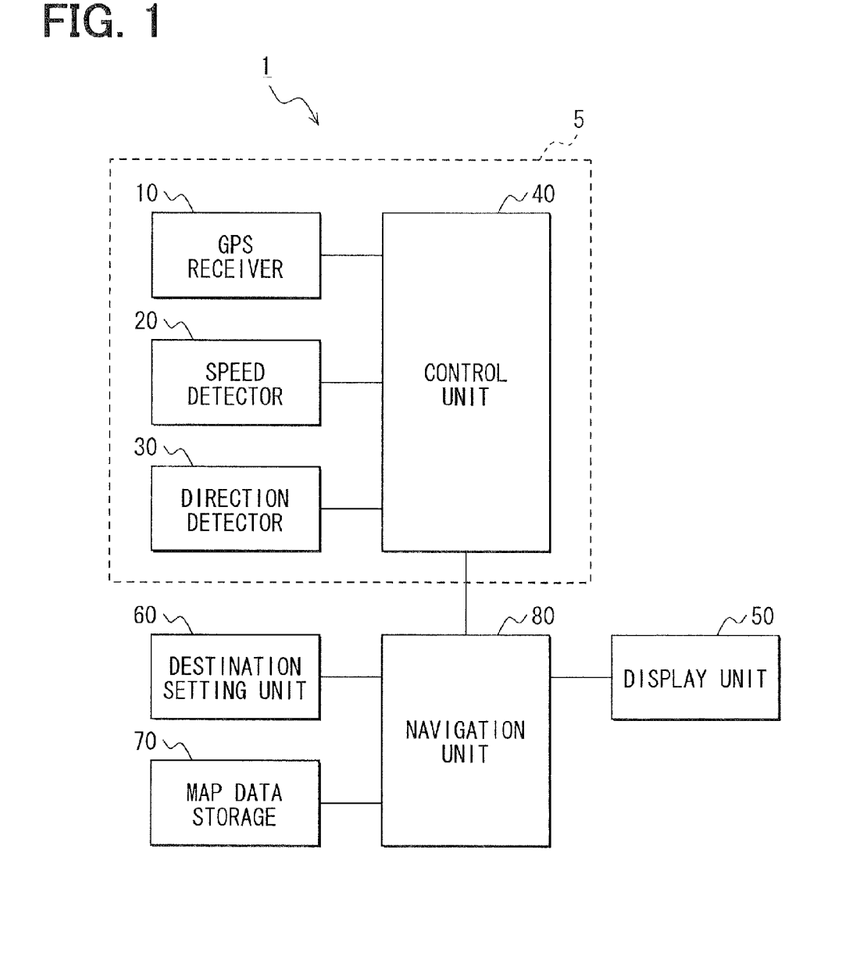
FIG. 1 is a block diagram of a vehicle navigation apparatus in an embodiment of the present disclosure.
Figure 2:
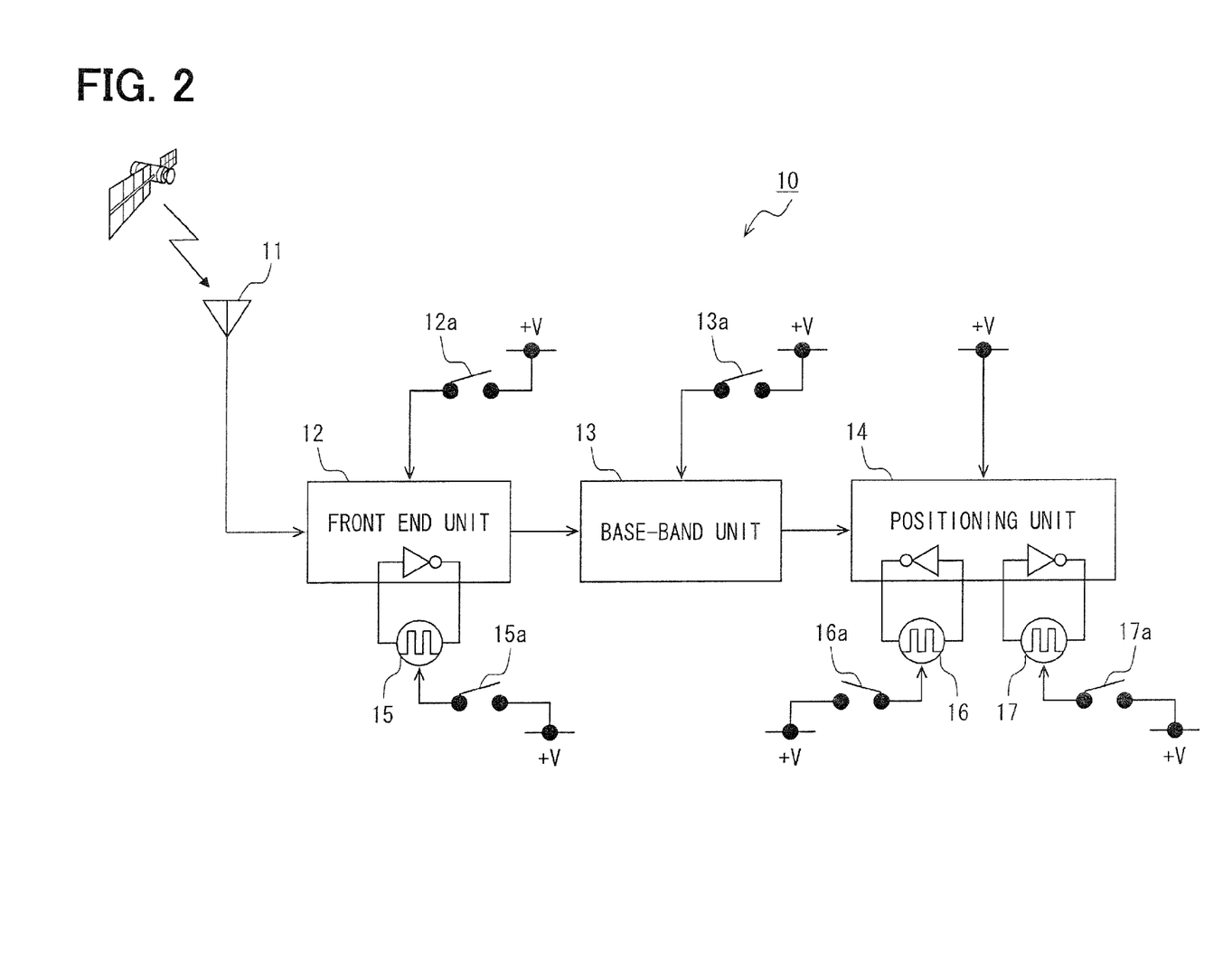
FIG. 2 is a block diagram of a GPS receiver of the vehicle navigation apparatus of FIG. 1.

With reference to FIGS. 1 and 2, a vehicle navigation apparatus 1 for use in a vehicle includes a positioning device 5, a display unit 50, a destination setting unit 60, a map data storage 70, and a navigation unit 80.

The display unit 50 displays images to a user of the vehicle, and may be a display panel, such as a LED panel, an organic electroluminescence panel, or a CRT. The destination setting unit 60 is a device that allows the user to input destination information, which is used to determine the possible travel course of the vehicle. The destination setting unit 60 may be a film-like touch sensor disposed on a screen of the display unit 50 and/or a push button around the screen, or the like.

The map data storage 70 stores map data to be used for a route guidance of the vehicle, which is capable of reading data from an HDD, a DVD, a CD-ROM, or the like.

The navigation unit 80 includes a CPU, a ROM, a RAM and an input/output (I/O), which are not illustrated, and performs a navigation process according to a program stored in the ROM. By way of example, the navigation unit 80 may perform the following navigation process, which is well known in the art: (a) a route guidance process: based on the current vehicle position acquired from the positioning device 5 and map data, a travel route towards the destination inputted into the destination setting unit 60 is provided to the user of the vehicle; (b) a display control process: displays, as an image on the display unit 50, the current position of the vehicle on a map that is created with the map data stored in the map data storage 70; and (c) a map matching process: the current vehicle position acquired from the positioning device 5 is matched to a position of the road in the map, which is being displayed on the display unit 50.

The positioning device 5 includes a GPS receiver 10, a speed detector 20, a direction detector 30, and a control unit 40. The GPS receiver 10 is installed in the vehicle, and a signal transmitted from multiple GPS satellites is received by the GPS receiver 10, and based on the signals, the GPS receiver determines the current position of the vehicle.

The speed detector 20 is a sensor that detects a travel speed of the vehicle. Specifically, the speed detector 20 determines a speed of the vehicle by a rotation speed of a tire axle by counting the number of pulses from a pulse generator on the tire axle, or based on an output voltage from a generator that generates a voltage in proportion to a rotation speed of the tire axle.

The direction detector 30 is a sensor that detects the travel direction of the vehicle. Specifically, the direction detector 30, may detect an angular speed by using a mechanical gyro sensor or an optical gyro such as a ring laser gyro sensor, which are not illustrated, and detects an angular acceleration by using an angular acceleration sensor, which is not illustrated, for the calculation and output of a direction angle $\phi$ (i.e., azimuth) according to the following Equation 1.

$$\phi = \Sigma(a \cdot t \times \cos\theta + b) \quad \text{Equation 1}$$

In the Equation 1, "a" is the sensitivity of the gyro sensor, "t" is the lapse time, "cos θ" is a correction by the angular acceleration sensor, and "b" is the offset voltage of the gyro sensor.

With reference to FIG. 2, the GPS receiver 10 has a reception antenna 11, a front end unit 12, a base-band unit 13, a positioning unit 14, a first clock signal generator 15, a second clock signal generator 16, and a third clock signal generator 17.

The reception antenna 11 receives an electric wave with a frequency of 1,575.42 MHz transmitted from the multiple GPS satellites. The reception antenna 11 may be a patch antenna, a film antenna, or the like.

The front end unit 12 converts the electric wave received by the reception antenna 11 into a signal with a frequency suitable for a signal handling process performed by the other units. Thus, the electric wave with a frequency of 1,575.42 MHz from the GPS satellite is converted into a signal having an intermediate frequency by a super-heterodyne method, or the like, and is outputted to the base-band unit 13. The front end unit 12 may have a FE power switch 12a for switching on/off of a power supply to the front end unit 12.

The base-band unit 13 is a circuit that receives the output signal from the front end unit 12, and outputs the signal as data. The data provided by the base-band unit 13 includes clock correction information, orbit information (e.g., ephemeris and almanac), and a navigation message, such as a correction coefficient of ionization layer delay, and the like. The base-band unit 13 may include a BB power switch 13a for switching on/off of a power supply to the base-band unit 13.

Based on the data received from the base-band unit 13, the positioning unit 14 performs a positioning process. Details of the positioning process by the positioning unit 14 of the GPS receiver 10 are well-known in the arts.

The first clock signal generator 15 is an oscillator for generating a front end clock signal to operate the front end unit 12. The second clock signal generator 16 is an oscillator for generating a real-time clock signal to decrease an electric current and shorten a positioning time when the positioning unit 14 is put in a standby state. The third clock signal generator 17 is an oscillator for generating a standard clock signal that has a higher frequency than the real-time clock signal for operating the positioning unit 14. In the first to third clock signal generators 15, 16, 17, the first to third power switches 15a, 16a, 17a are provided for turning on/off of a power supply to the first to third clock signal generators 15, 16 17, respectively.

The control unit 40 of the positioning device 5 includes a CPU, a ROM, and a RAM as well as an I/O, which are not illustrated. The control unit 40 performs a control process to determine the position of the vehicle, which is described in detail below with reference to FIG. 3. First, based on the travel speed of the vehicle detected by the vehicle speed detector 20 and the travel direction of the vehicle detected by the direction detector 30, the position of the traveling vehicle is further estimated, which is referred to as an estimated current position. The described estimation determination may be referred to as a position estimation process.

Next, the control unit 40 calculates the error of the current vehicle position based on an accumulated value of errors over time in at least one of vehicle speed detection and travel direction detection by the vehicle speed detector 20 and the direction detector 30, respectively. This may be referred to as an error calculation process.

Based on the current vehicle position detected by the GPS receiver 10, the estimated current position of the vehicle is corrected. This may be referred to as a position error correction process. After the position error correction process, power supply to the GPS receiver 10 is turned off. When power supply to the GPS receiver 10 is turned off, power supply to the front end unit 12 and the base-band unit 13 are turned off. Additionally, the front end clock signal and the real-time clock signal are stopped by turning off of the power supply to the first clock signal generator 15 and to the second clock signal generator 16. This may be referred to as a power supply turn-off process.

When the GPS receiver 10 is turned off the position estimation process starts determining whether the accumulated error of the current vehicle position is within a predetermined error tolerance. This may be referred to as a determination process. The allowable range of the error tolerance is dependent upon the location of the vehicle, as determined by an alternative position probability, which is described in detail below.

When the accumulated error exceeds the error tolerance, power to the GPS receiver 10 is resumed, and the GPS receiver is turned on. Based on the current vehicle position detected by the GPS receiver 10, the current vehicle position estimated by the position estimation process is corrected.

(Explanation of a Control Process)

Figure 3:
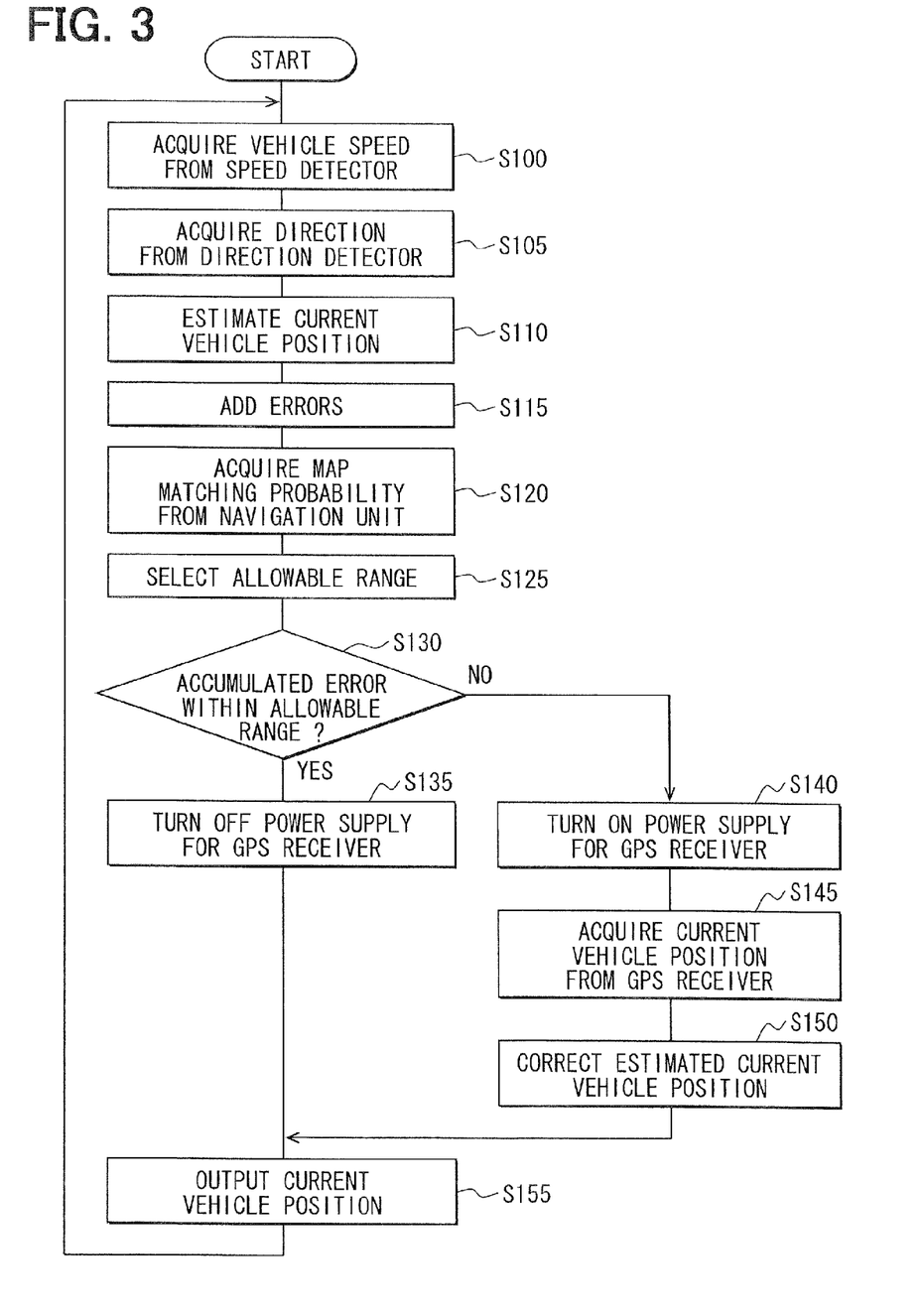
FIG. 3 is a flowchart of a positioning process performed in a control unit of the vehicle navigation apparatus of FIG. 1.

With reference now including FIG. 3, the control process performed by the control unit 40 is explained in detail.

The control process is initiated when a route guidance is requested by the vehicle navigation apparatus 1. The process, in S100 and S105, acquires a vehicle speed from the speed detector 20 in S100, and a travel direction of the vehicle from the direction detector 30, respectively.

Based on the vehicle speed and the travel direction of the vehicle, the process, in S110, estimates the position of the vehicle. The position coordinates of the vehicle can be calculated in the following manner. When the vehicle speed from the speed detector 20 is designated as "v" and the direction of the vehicle from the direction detector 30 is designated as "φ", the (x, y) coordinates of the estimated current vehicle position on a two dimensional plane are calculated by the following Equation 2.

$$(v \cdot \cos(\phi), v \cdot \sin(\gamma))$$ Equation 2

The process, in S115, adds the possible errors associated with the sensors in the current vehicle position that was estimated in S110. Specifically, in regards to the position error, since the direction detected by the gyro sensor includes, as an error, the offset voltage "b" shown in Equation 1, the error due to the offset voltage "b" is added to a calculation value every time the control process determines the vehicle direction, thereby accumulating many errors in the calculated value as time lapses, which may be referred to as a time-wise accumulation of the error.

The time-wise accumulation of the error of at least one of the speed detector 20 and the direction detector 30 means an accumulation of errors in detection values of the vehicle speed and/or the travel direction over a certain period of time. More practically, the time-wise accumulation of the error may be calculated as an accumulated value of the speed detection error over a certain period of time, an accumulated value of the direction detection error over a certain period of time, or a greater value among those two values, or a smaller value among those two values, or a vector sum of those two values, or a square sum of those two values.

The process, in S120, acquires the alternative position probability from the navigation unit 80. The alternative position probability is the likelihood that the vehicle is currently traveling or is positioned near multiple roads that are close to each other. For example, the vehicle may be positioned near two branched roads with a narrow separation angle, or a grid of roads that are close together, or the like. Specifically, with a certain amount of positioning error, the vehicle may be traveling on a road A or on a road B, where road A and B are positioned in close proximity together. In other words, the vehicle position may be matched with multiple roads with certain indefiniteness.

Accordingly, the alternative position probability has a greater value when the current vehicle position is close to narrow angle branch roads or grid roads (i.e., two or more roads), and has a smaller value when the vehicle position is close to a straight road that does not have branches or the like (i.e., only one road). The alternative position probability is acquired from the navigation unit 80 for the display of the vehicle position on the display unit 50, that is, on a map after map matching of the vehicle position data onto the map data.

The alternative position probability is used to select the error tolerance at which the estimated vehicle position is permitted to be within. Specifically, when the acquired alternative position probability is high, the error tolerance is set to a smaller threshold than when the alternative position probability is low. Accordingly, when the vehicle is traveling in an area with many branching roads resulting in a high alternative position probability, the error tolerance is set low such that the accuracy as to which road the vehicle is traveling on is not effected. Therefore, when the vehicle is traveling in an area where there are not many roads, then the error tolerance is set high because the position of the vehicle can be matched to one road, the road the vehicle is traveling on.

A predetermined correlation between possible alternative position probability values and a corresponding error tolerance is stored in the ROM. Specifically, a plurality of possible alternative position probability values, which is based on the current vehicle position, and an associated error tolerance to which the accumulated error of the current vehicle position must be within is stored in the ROM.

For example, multiple probability value steps (i.e., ranges) with the boundary of the steps/ranges spreading from a low value to a high value are defined first, as a classification of probability values, each of which represents a probability of the current vehicle position existing on multiple roads on the map. The smallest allowable error tolerance from among the plurality of predetermined error tolerances is selected when the existence probability of the current vehicle position existing on multiple roads on the map takes a value that falls within the highest alternative position probability value range. On the other hand, the when the alternative position probability value falls within the lowest range of the probability value, which indicates that the current vehicle position is not close to multiple roads that are in close proximity to each other, the most lenient or the largest allowable error tolerance is selected from among the plurality of predetermine error tolerances.

Based on the alternative position probability, the process, in S125, selects the error tolerance. The error tolerance may be provided as a boundary index β. The boundary index is defined as ratio of a true value of the current vehicle position against the estimated current vehicle position that includes the accumulated error. Assuming that the current vehicle position acquired from the GPS receiver 10 is a true value, ($\alpha_0$), β=$\alpha_0$/α, where "α" is the estimated current vehicle position that has the accumulated error. Accordingly, the boundary index of the error tolerance may have a maximum value of "1" when $\alpha_0$=α. Furthermore, due to the accumulating error, the value of α increases, thus β<1.

As stated earlier, the error tolerance is based on the alternative position probability. Therefore, when the alternative position probability is high, a value $\beta_0$ closer to 1 is selected as the boundary index of the error tolerance, and when the alternative position probability is low, a value $\beta_0$ closer to 0 is selected as the boundary index of the error tolerance.

Once the value of the error tolerance is selected in S125, the process, then determines, in S130, whether the accumulated error is within the error tolerance. When the accumulated error is within the error tolerance (S130:Yes), the process proceeds to S135 where the power supply to the GPS receiver is shut-off. When the accumulated error is beyond the error tolerance (S130:No), the process proceeds to S140 where the GPS receiver is turned-on.

Figure 4:
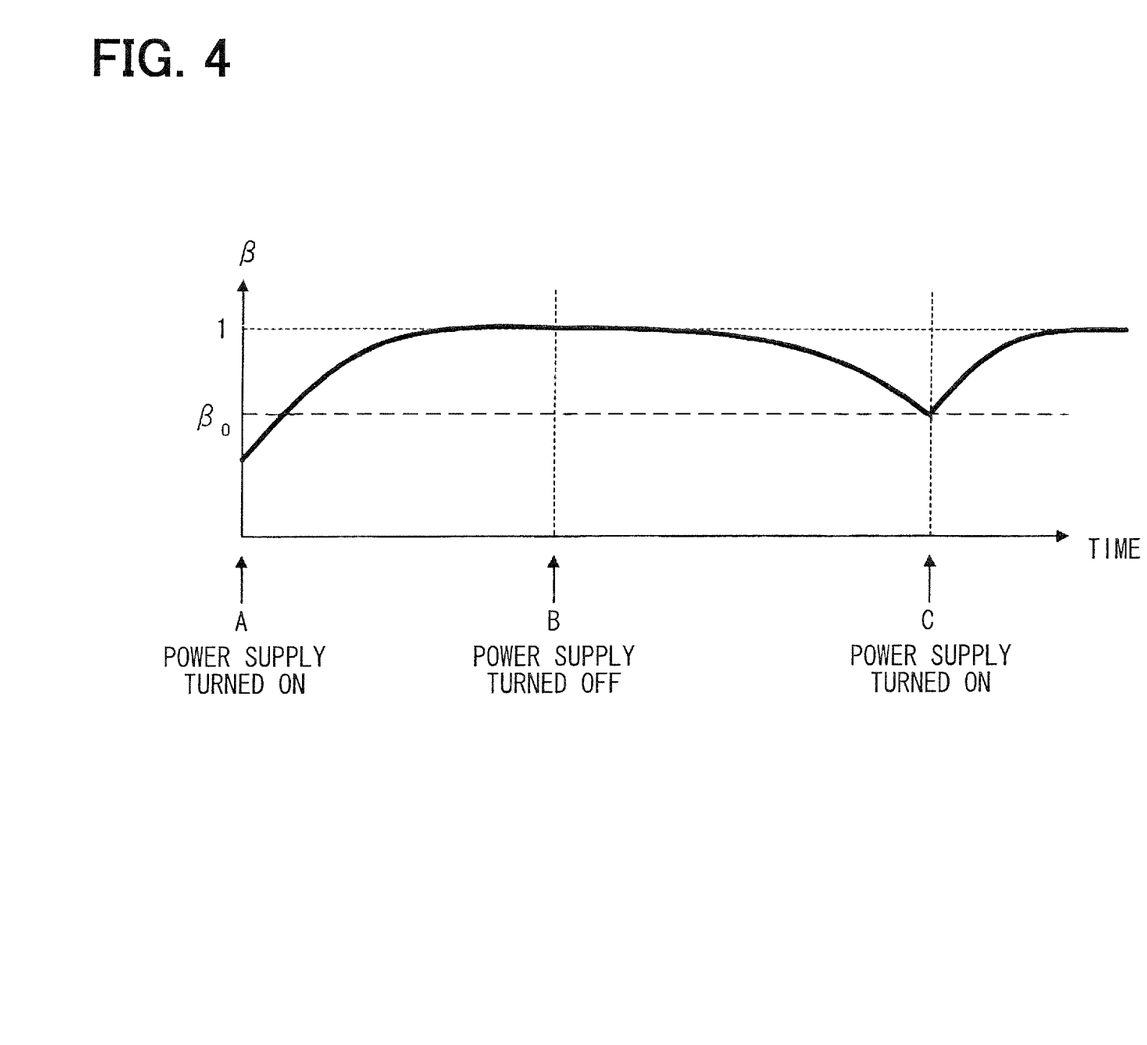
FIG. 4 is an illustration of a determination method with a first error tolerance.
Figure 5:
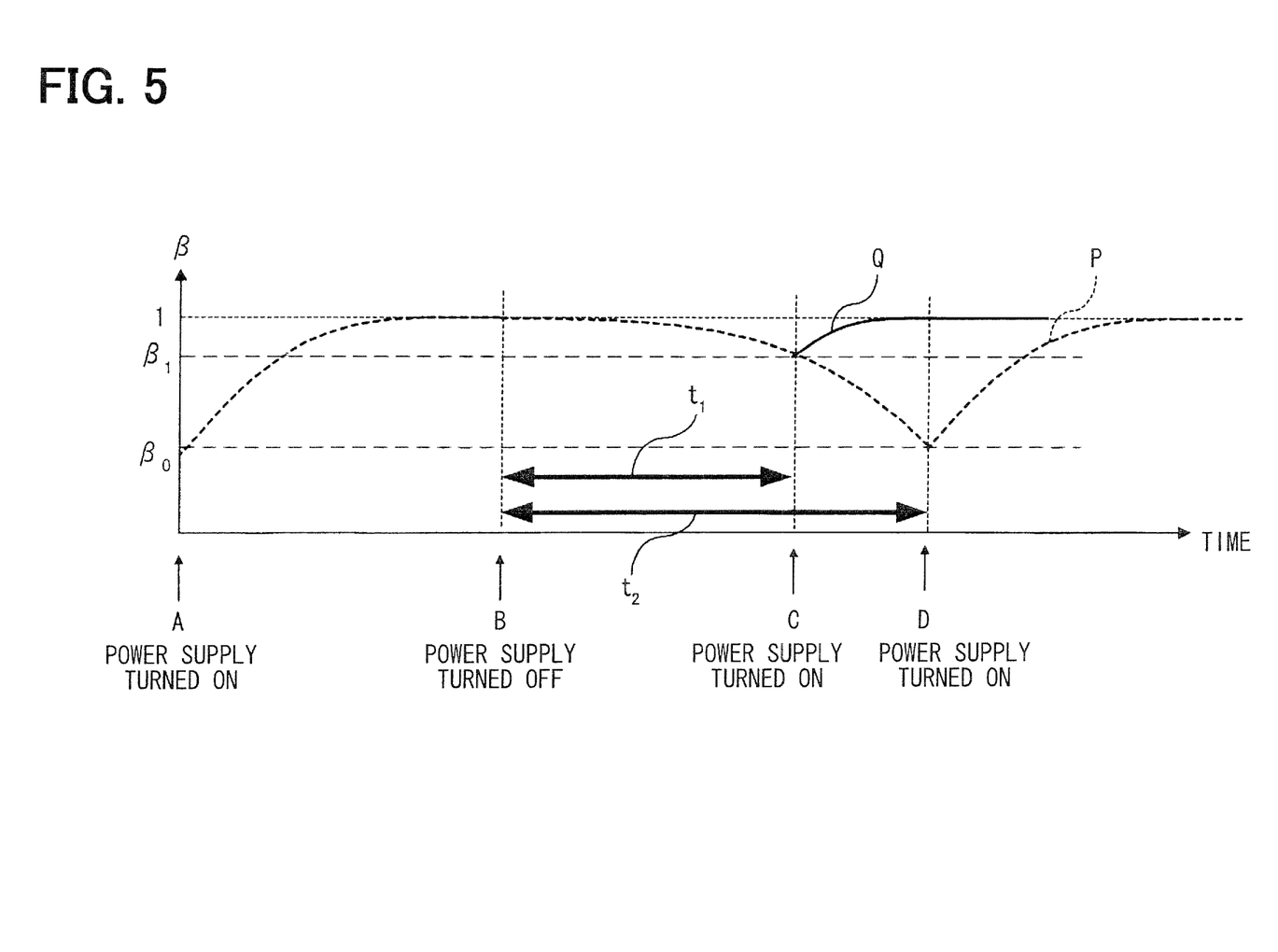
FIG. 5 is an illustration of a determination method with the first error tolerance of FIG. 4 and a second error tolerance.

With reference now including FIGS. 4 and 5, the determination of whether the accumulated error exceeds the error tolerance is explained in detail. In FIG. 4, at point A the power supply to the navigation apparatus 1 is turned on, and the value of the boundary index, $\beta$, increases, such that the estimated current position is closer to the true value, which is measured by the GPS receiver. When the boundary index reaches its maximum value of "1", the true value and the estimated vehicle position are equal.

At a point B, where $\beta=1$, the power supply to the GPS receiver 10 is turned off. As time lapses, the value of $\alpha$ increases, and, accordingly, value of the boundary index $\beta$ decreases. At point C, the value of the boundary index $\beta$ becomes less than the boundary index $\beta_0$ of the error tolerance. Thus, the accumulated error has surpassed the allowable error tolerance. At point C the power supply to the GPS receiver 10 is turned on to correct the estimated current vehicle position to the true value. The boundary index $\beta$ increases as the estimated current vehicle position becomes closer to the true value. Once the boundary index is equal to "1" ($\beta=1$), the power supply to the GPS receiver 10 is turned off, leading to the gradual decrease of the value of the index $\beta$, thus repeating the process.

In FIG. 5, the boundary index $\beta$ of the error tolerance is defined as either $\beta_0$ or $\beta_1$, depending on the alternative position probability. A line P, which is shown as a broken line curve, represents the curve of FIG. 4 where the boundary index of the error tolerance is $\beta_0$. A line Q (i.e., a solid curve) representing the transition of the process when the boundary index of the error tolerance is $\beta_1$, which is stricter (i.e., higher) than the boundary index of the error tolerance $\beta_0$. Accordingly, the alternative position probability of $\beta_1$ is higher than the alternative position probability of $\beta_0$.

As shown in FIG. 5, when the error tolerance is set at a stricter boundary index $\beta_1$, the boundary index $\beta$ is equal to or less than $\beta_1$ at point C, which is at time $t_1$. Thus the accumulated error is greater than the error tolerance, and the GPS, receiver is turned on. When the boundary index is $\beta_0$ the accumulated error does not surpass the error tolerance ($\beta<\beta_0$) till time $t_2$ at point D, where $t_1<t_2$. Therefore, a stricter boundary index turns the GPS receiver 10 on sooner than a lenient boundary index because the accumulated error is kept within a stricter error tolerance. This allows the vehicle navigation apparatus 1 to provide a more accurate positioning of the vehicle when the vehicle is traveling in an area where a certain amount of error in the estimated current position would match the vehicle's position to multiple roads.

Conventionally, when the power supply to the GPS receiver 10 is turned off, the GPS receiver 10 may have a comparatively long start-up time to re-start the operation of the GPS receiver 10. In other words, time to receive the signal from the GPS satellite and to start the positioning after the next tuning on of the power supply, becomes a trade off when providing power efficiency. Additionally, correction of the current position of the vehicle requires a additional time when the power supply to the GPS receiver 10 is being turned off and then restarted, thereby deteriorating the position accuracy of the vehicle navigation apparatus 1.

As provided earlier, when the power supply to the GPS receiver 10 is turned off the power supply to the front end unit 12 and the base-base band unit 13 are also turned off by switching the FE power switch 12a and the BB power switch 13a, respectively, to the off position. In addition, the front end clock signal and the real-time clock signal are stopped by turning off the first switch 15a and the second switch 16a, respectively. At such time, the third switch 17a remains in the on position, and the standard clock signal continues to be supplied to the positioning unit 14.

By controlling the power supply of the GPS Receiver 10, the efficiency of electric power consumption is improved without deteriorating the positioning accuracy. Specifically, with reference to FIG. 6, a clock signal supplied to the positioning unit 14 and a re-satellite capture time is shown. The vertical axis is a measured frequency error between the signal from the GPS satellite and the clock signal from the positioning unit 14, and the horizontal axis is time.

At a point A, the power supply to the GPS receiver 10 is on, and the GPS receiver 10 is capturing data from the GPS satellite. When the power supply to the GPS receiver 10 is turned off at point B of FIG. 6, the time of recapturing by the real-time clock signal, as shown as a line R, is set to a time that is measured by the real-time clock signal at point C where the power supply is turned on in order to recapture the GPS satellite, which is accomplished at point X.

Figure 6:
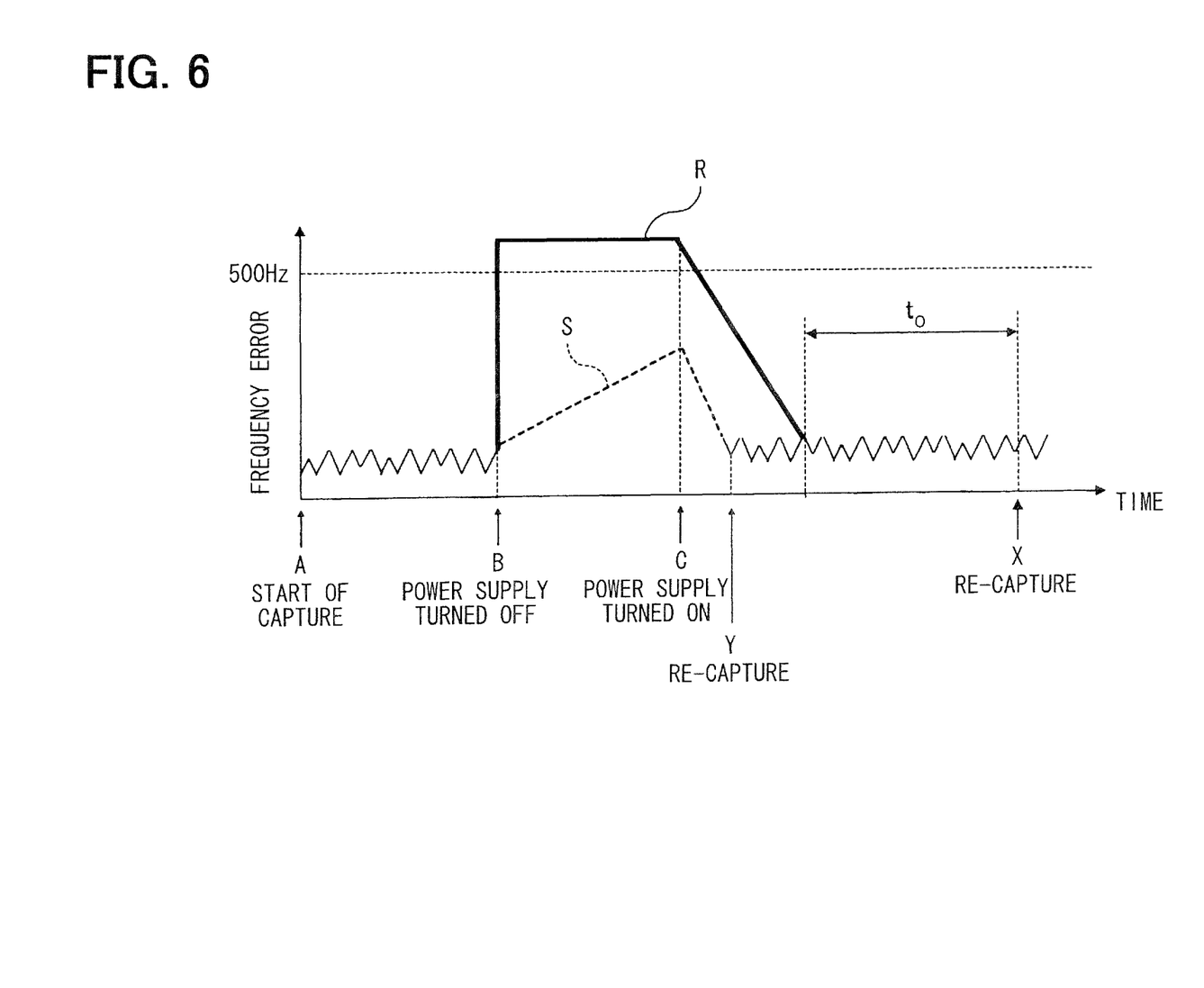
FIG. 6 is an illustration of a clock signal supplied for a positioning unit and a satellite re-capture time.

Due to the lower resolution of the real-time clock signal, demodulation of the navigation data from the satellite is required for the assurance of the data reliability. Therefore, 6 to 12 seconds is usually required for the demodulation, time $t_0$.

In comparison, the standard clock signal has a higher frequency than the real-time clock signal, and does not require demodulation. Therefore, the time of recapturing by the standard clock signal, as shown as a line S, is set to a time that does not require demodulation. Thus at point C when the power is turned on to the GPS receiver 10, recapturing of data from the GPS satellite is performed at point Y. Due to the higher resolution of the standard clock signal, the time to recapture of the satellite is reduced as shown at point Y, in comparison to the recapturing based on the real-time clock signal, as show at point X.

As described above, by using the standard clock signal, the time to recapture the satellite is substantially reduced, and maybe equal to or smaller than 1 second, which is much shorter than the recapture by using the real-time clock signal. As a result, the deterioration of the positioning accuracy is prevented.

With reference back to FIG. 3, when the accumulated error is not within the error tolerance, the process, in S140, turns on the power supply to the GPS receiver 10. Accordingly, the power supply to the front end unit 12 and the base-band unit 13 is also turned on by switching the position of the FE power switch 12a and the BB power switch 13a, respectively, to the "on" position. The front end clock signal for the front end unit 12 and the real-time clock signal for the positioning unit 14 are also turned on by switching the first switch 15a and the second switch 16a, respectively, to the "on" position.

The process, in S145, acquires the current vehicle position from the GPS receiver 10, and, in S150, the estimated current vehicle position, which is estimated in S110, is corrected to the current vehicle position.

After the estimated current vehicle position is corrected in S145, or after the GPS receiver is turned off in S135, the process, in S155, outputs the current vehicle position to the navigation unit 80, and the control process is repeated thereafter. At the end of the route guidance by the vehicle navigation apparatus 1, this control process is finished.

The vehicle navigation apparatus 1, as described above, keeps the GPS receiver 10 in the "off" state, when the accumulated error of the estimated current vehicle position is within the error tolerance, and turns the GPS receiver 10 "on" to correct the estimated current vehicle position, when the accumulated error of the estimated current vehicle position exceeds the error tolerance Therefore, the accuracy of the vehicle's position is controlled by setting the error tolerance to an appropriate level that is based on the current location of the vehicle. In addition, by keeping the power supply to the GPS receiver 10 turned off while the accumulated error of the estimated current vehicle position is within the predetermined error tolerance, reduction of power consumption by the GPS receiver 10 is achieved.

By configuring the GPS receiver 10, such that the standard clock signal continuously inputs to the positioning unit 14, the time necessary to recapture the signal from the GPS satellite and time to start the positioning are respectively reduced, thereby reducing the time necessary to correct the current vehicle position. Therefore, the correction of the current vehicle position is performed in an effective manner, thereby preventing deterioration of the positioning accuracy of the vehicle.

Further, when the probability that the vehicle's position can be designated on multiple roads, the error tolerance can be set to a small value that requires the accumulated error to be minimal. When the current vehicle position is closer to, for example, a branch of two roads with a narrow separation angle, or is closer to grid roads, the probability that the current vehicle position may exist on multiple roads on the map, which is drawn by the map data stored in the map data storage, is relatively high. On the other hand, when the current vehicle position is close to a straight road with no branch and/or intersection, the probability that the current vehicle position may exist on multiple roads may be relatively low. Therefore, the positioning accuracy of the vehicle navigation apparatus 1 can be improved when the error tolerance is stricter or smaller for a higher alternative position probability, and the error tolerance is more lenient for a lower alternative position probability. Therefore, the power supply turn off period can be increased, thereby reducing the power consumption of the vehicle navigation apparatus 1. Thus, the power saving effects of the vehicle navigation apparatus 1 is improved without losing accuracy according to such power supply turn off scheme.

Although the present disclosure has been fully described in connection with reference to the accompanying drawings, it is to be noted that various changes and modifications will become apparent to those skilled in the art.

In the above embodiment, the vehicle navigation apparatus 1 using GPS as a positioning system is explained. However, the vehicle navigation apparatus 1 may use one of other GNSSs having the same positioning method as GPS. For example, other GNSS may include, GALILEO (Europe), GLONASS (Russia), a quasi-zenith satellite (Japan) may be used.

In the above described disclosure, the positioning device 5 is installed in a vehicle. However, the positioning device 5 may be adapted for a train, a ship, an airplane, or the like. Further, the positioning device 5 may be carried by a person that also serves as a mobile object.

In the above described disclosure, the accumulated error of the estimated current vehicle position over a certain period of time is examined relative to the error tolerance. That is, the error is calculated as the square sum of the coordinates of the estimated current vehicle position acquired from the equations 1 and 2 based on the detected vehicle speed and direction. However, the absolute value of the direction error acquired from the Equation 2 may be accumulated for a certain period of time for the examination relative to the error tolerance.

In addition, the direction error acquired from the Equation 2 may be added as a vector as the time lapses, and the size of such vector or the angle of such vector may be used as the error.

In the above described disclosure, for the purpose of turning off the power supply for the GPS receiver 10, the power supply to the front end unit 12 the base-band unit 13, the first clock signal generator 15 for stopping the front end clock signal, and the second clock signal generator 16 for stopping the real-time clock signal are turned off. However, all power supplies for the GPS receiver 10 may be turned off.

In such manner, even though the recapture time of the GPS satellite after turning on of the GPS receiver 10 becomes longer, the reduction of the power consumption becomes greater, with the temporary deterioration of the positioning accuracy in some cases.

Such changes, modifications, and summarized schemes are to be understood as being within the scope of the present disclosure as defined by appended claims.

What is claimed is:

1. A mobile object positioning device comprising:
a GNSS receiver installed on a mobile object for receiving a signal transmitted from a GNSS satellite and for detecting a current position of the mobile object based on the received signal;
a speed detector for detecting a travel speed of the mobile object;
a direction detector for detecting a travel direction of the mobile object;
a position estimation unit for estimating a current position of the mobile object based on the travel speed of the mobile object detected by the speed detector and travel direction of the mobile object detected by the direction detector;
an error calculation unit for calculating an error of the estimated current position of the mobile object based on a time-wise accumulation of at least one of the error of the travel speed of the mobile object and the error of travel direction of the mobile object;
a control unit for repeating (i) turning off a power supply for the GNSS receiver after correcting the estimated current position of the mobile object estimated by the position estimation unit based on the current position of the mobile object detected by the GNSS receiver, (ii) determining whether the error of the estimated current position of the mobile object, calculation of which is started at a time of turning off of the GNSS receiver, is within a predetermined error tolerance, and (iii) turning on the power supply for the GNSS receiver to correct the estimated current position of the mobile object from the position estimation unit based on the detected current position from the GNSS receiver,
wherein the GNSS receiver includes:
a reception antenna for an electric wave from the GNSS satellite;
a front end unit for converting the electric wave received by the reception antenna to an output signal of a frequency that is suitable for signal processing and for outputting the output signal;

a base-band unit for performing signal processing for the output signal from the front end unit and for outputting the processed signal as data; a positioning unit for performing a positioning process based on the data output from the base-band unit;

a first clock signal generation unit for generating a front end clock signal for operating the front end unit;

a second clock signal generation unit for generating a real-time clock signal for reducing a standby electric current of the positioning unit and for reducing a positioning time of the positioning unit; and a third clock signal generation unit for generating a standard clock signal that has a higher frequency than the real-time clock signal for operating the positioning unit, and wherein when the power supply for the GNSS receiver is turned off, the control unit turns off the power supply for the front end unit, the base-band unit, the first clock signal generation unit to stop the front end clock signal, and the second clock signal generation unit to stop the real-time clock signal.

2. A vehicle navigation apparatus comprising:

a mobile object positioning device installed in a vehicle that serves as a mobile object including a GNSS receiver installed on the mobile object for receiving a signal transmitted from a GNSS satellite and for detecting a current position of the mobile object based on the received signal;

a speed detector for detecting a travel speed of the mobile object;

a direction detector for detecting a travel direction of the mobile object;

a position estimation unit for estimating a current position of the mobile object based on the travel speed of the mobile object detected by the speed detector and travel direction of the mobile object detected by the direction detector;

an error calculation unit for calculating an error of the estimated current position of the mobile object based on a time-wise accumulation of at least one of the error of the travel speed of the mobile object and the error of travel direction of the mobile object;

a control unit for repeating (i) turning off a power supply for the GNSS receiver after correcting the estimated current position of the mobile object estimated by the position estimation unit based on the current position of the mobile object detected by the GNSS receiver, (ii) determining whether the error of the estimated current position of the mobile object, calculation of which is started at a time of turning off of the GNSS receiver, is within a predetermined error tolerance, and (iii) turning on the power supply for the GNSS receiver to correct the estimated current position of the mobile object from the position estimation unit based on the detected current position from the GNSS receiver, a display unit for displaying an image;

a destination setting unit for setting a destination of a travel of the vehicle according to a user operation;

a map data storage for storing map data of a map that is used for a route guidance of the vehicle;

a route guidance unit for performing the route guidance toward the destination set by the destination setting unit based on the current position of the vehicle from the mobile object positioning device and the map data;

a display control unit for displaying the current position of the vehicle during the route guidance toward the destination performed by the route guidance unit, as an image of the map data on the display unit after reading the data from the map data storage, in a manner that superposes the current position of the vehicle on the map, wherein the GNSS receiver includes:

a reception antenna for an electric wave from the GNSS satellite;

a front end unit for converting the electric wave received by the reception antenna to an output signal of a frequency that is suitable for signal processing and for outputting the output signal;

a base-band unit for performing signal processing for the output signal from the front end unit and for outputting the processed signal as data;

a positioning unit for performing a positioning process based on the data output from the base-band unit;

a first clock signal generation unit for generating a front end clock signal for operating the front end unit;

a second clock signal generation unit for generating a real-time clock signal for reducing a standby electric current of the positioning unit and for reducing a positioning time of the positioning unit; and a third clock signal generation unit for generating a standard clock signal that has a higher frequency than the real-time clock signal for operating the positioning unit, and wherein when the power supply for the GNSS receiver is turned off, the control unit turns off the power supply for the front end unit, the base-band unit, the first clock signal generation unit to stop the front end clock signal, and the second clock signal generation unit to stop the real-time clock signal.

3. The vehicle navigation apparatus of claim 2, wherein the display control unit displays the current position of the vehicle from the mobile object positioning device on the map of the map data stored in the map data storage in a map matching manner, and the control unit of the mobile object positioning device has a plurality of predetermined error tolerances that the error of the estimated current position of the vehicle must be within, wherein after calculating an alternative position probability indicating the probability that the after-correction current position of the vehicle exists on multiple roads, the control unit selects an error tolerance that requires minimal error in the estimate current position of the vehicle when the alternative position probability is high indicating that the estimated current position of the vehicle is close to multiple roads that are in close proximity to each other.

* * * * *